United States Patent [19]
Neudecker

[11] 3,722,988
[45] Mar. 27, 1973

[54] MOTION PICTURE PROJECTOR FOR USE WITH FILM-CONTAINING CASSETTES

[75] Inventor: Karl Neudecker, Munich, Germany

[73] Assignee: Agfa-Gevaert Aktiengesellschaft, Leverkusen, Germany

[22] Filed: June 22, 1971

[21] Appl. No.: 155,467

[30] Foreign Application Priority Data

June 23, 1970 Germany..................P 20 31 005.8

[52] U.S. Cl. .................352/125, 242/205, 352/72, 352/158
[51] Int. Cl. ........................................G03b 23/00
[58] Field of Search........352/125, 124, 123, 72, 158; 242/181, 205

[56] References Cited

UNITED STATES PATENTS

| | | | |
|---|---|---|---|
| 3,342,541 | 9/1967 | Mouissie et al.............. | 352/125 X |
| 3,561,853 | 2/1971 | Thevenaz................... | 352/125 X |
| 3,550,879 | 12/1970 | Bundschuh et al........... | 352/72 X |

*Primary Examiner*—Richard L. Moses
*Attorney*—Michael S. Striker

[57] ABSTRACT

A motion picture projector wherein two takeup reels are pivotable about vertical axes together with hollow guide members having inlets movable into and out of register with the slot of a switching device. The housing of the projector supports a set of cassettes which are movable sideways to assume a viewing position and thereupon a rewinding position. An automatic film threading mechanism advances the leader of film in the cassette occupying the viewing position behind the projection lens, through the switching device and into one of the guide members so that the leader is attached to the core of the respective reel. At the same time, a rewinding mechanism transports the film from the core of the other reel into the cassette occupying the rewinding position. The reels and the guide members are pivoted whenever the cassettes are shifted by a step whereby the guide member which moves out of registry with the switching device withdraws the respective film from the slot so that such film can be returned into the respective cassette without passing through the switching device. The latter is pivotable between two end positions to place the outlet of its slot into registry with the inlet of one guide member in one end position and into registry with the inlet of the other guide member in the other end position.

16 Claims, 5 Drawing Figures

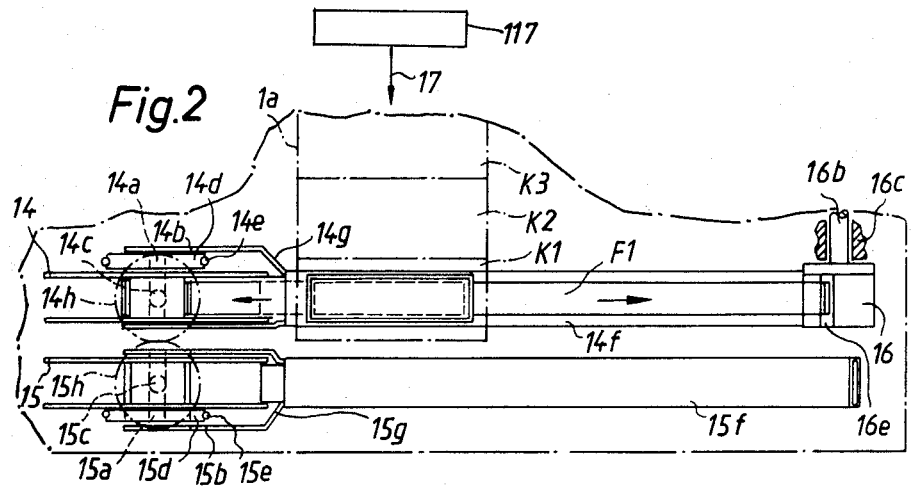
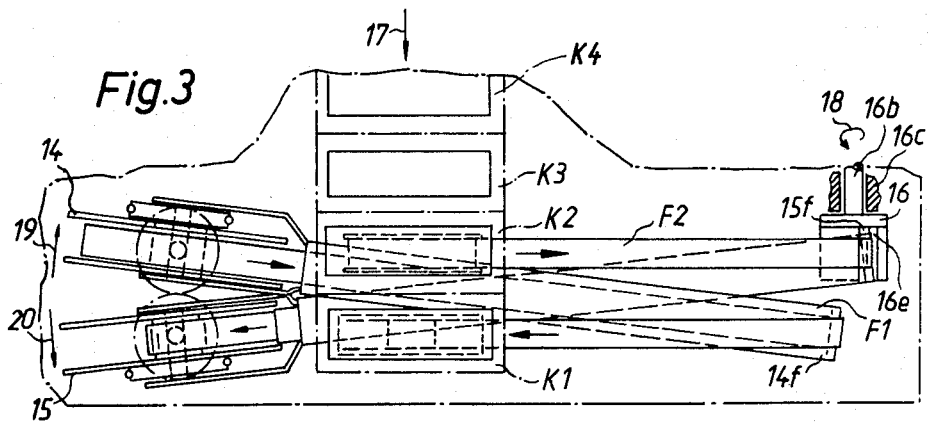
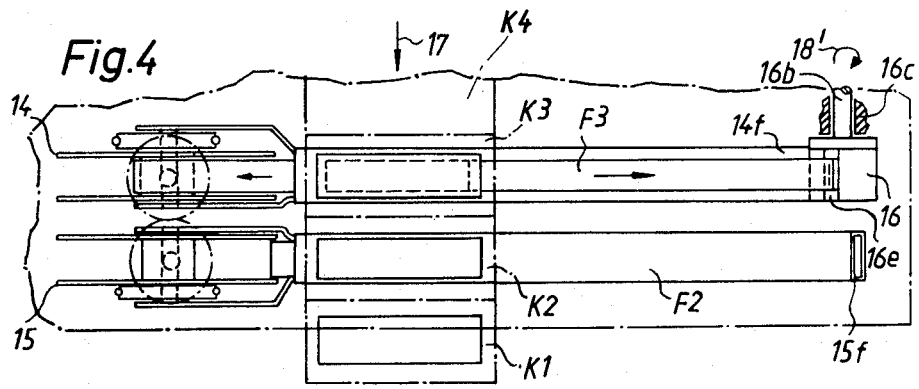

MOTION PICTURE PROJECTOR FOR USE WITH FILM-CONTAINING CASSETTES

BACKGROUND OF THE INVENTION

The present invention relates to cinematographic apparatus in general, especially to motion picture projectors, and more particularly to improvements in motion picture projectors for use with cassettes for supplies of convoluted motion picture film. Still more particularly, the invention relates to improvements in motion pictures projectors wherein the images of frames on film contained in two or more successive cassettes can be viewed in rapid sequence with minimal interruptions between the viewing of the last image on a preceding film and the first image on the next-following film. Such types of projectors are preferred for use when the entire sequence of images pertaining to a single subject or scene cannot be stored on a single film.

It is already known to provide a motion picture projector with means for accommodating a set of cassettes which contain supplies of convoluted motion picture film and to provide the projector with means for automatically advancing a fresh cassette into a viewing position in response to completed presentation of images on the frames of a preceding film. Such motion picture projector comprises two takeup reels which are fixedly mounted in the housing of the projector and can be driven to collect the film on their cores. One of the takeup reels collects the film which is being withdrawn from a cassette occupying the viewing position while the other reel pays out the film which is being returned into a cassette occupying a rewinding position. The projector further comprises a film guiding device which has a single inlet and two outlets directed toward the cores of the two takeup reels. The film guiding device is movable by a very complicated, bulky and costly mechanism which is prone to malfunction. Moreover, the film must pass through the film guiding device as well as through and/or along several additional film guiding parts, irrespective of whether the film is being withdrawn from a cassette which occupies the viewing position or is being returned into a cassette which occupies the rewinding position. Therefore, the film is subjected to considerable wear and is likely to be scratched or otherwise damaged, especially during rapid rewinding. In order to avoid excessive wear on the film, the rewinding mechanisms of such projectors are designed to transport the film at less than an optimum speed. For the same reasons, the automatic film threading mechanisms of such projectors are designed to thread the leader of film in a cassette occupying the viewing position at less than a desirable optimum speed in order to avoid excessive wear and/or damage to the film during transport of its leader toward the core of a takeup reel. This results in a lengthening of intervals between the presentations of images on successive films.

SUMMARY OF THE INVENTION

An object of the invention is to provide a cinematographic apparatus, especially a projector which is designed to be used with cassettes for motion picture film, with novel and improved film guiding, threading and collecting means which permits rapid threading of the leader of a film whose images are to be projected onto a screen or the like and rapid rewinding of film into the respective cassette.

Another object of the invention is to provide a motion picture projector for automatic presentation of images on the frames of two or more discrete films with simple, compact, rugged and reliable film threading, guiding and collecting means which subjects the film to little wear even if the film is being transported at a high speed and irrespective of whether such transport takes place in a direction to withdraw the film from the respective cassette or to return the film into the respective cassette.

A further object of the invention is to provide in an automatic motion picture projector for use with cassettes containing supplies of convoluted motion picture film a novel and improved switching device for motion picture film and a novel and improved mounting for the takeup reels which collect the film during projection of images onto a screen or the like.

The invention is embodied in a cinematographic apparatus, especially in a motion picture projector, which comprises a housing supporting a projection lens and a film gate behind the lens, means for supporting in or on the housing a series of supplies of convoluted motion picture film (each such supply is preferably stored in a discrete magazine or cassette), shifting means for moving the supplies sideways in stepwise fashion so as to place successive supplies first into a viewing position and thereupon into a rewinding position, first and second takeup reels rotatably mounted in or on the housing and pivotable therein about first and second axes between first and second positions (such axes are preferably vertical and normal to the axes of the respective takeup reels), a preferably pivotable switching device mounted in the housing downstream of the gate and having slot means for the passage of film therethrough in such a way that the film registers with the projection lens (i.e., that the film advances in front of the gate and behind the projection lens), first and second elongated preferably hollow guide means respectively arranged to share the pivotal movements of the first and second takeup reels so that the first and second guide means respectively guide the film between the slot means of the switching device and the cores of the respective takeup reels, film threading means arranged to transport the leader of film of the supply occupying the viewing position into the slot means and into the guide means which registers with such slot means, rewinding means for returning the film from the takeup reel associated with that guide means which is out of registry with the slot means of the switching device to the supply occupying the rewinding position, and means for pivoting the takeup reels on actuation of the shifting means so that the takeup reels are pivoted between their first and second positions whenever a fresh supply assumes the viewing position. During a first cycle of operation, a fresh film which is being withdrawn from the supply occupying the viewing position is advanced along a path which extends in front of the gate, through the slot means of the switching device, through one of the guide means and is convoluted around the core of the respective takeup reel; at the same time, the film which is convoluted on the core of the other takeup reel is caused to advance through the respective guide means and preferably bypasses the slot means of the switching device to be returned to the supply which occupies the rewinding position. During the next-following cycle, a fresh supply is moved to the viewing position and the supply which was maintained in such viewing position is moved to the rewinding position. The same operation is then repeated with the exception, however, that the takeup reels are pivoted with the respective guide means so that the guide means for film which is being returned to the supply in the rewinding position is out of register with the slot means of the switching device while the other guide means registers with such slot means to receive the film which is being withdrawn from the supply occupying the viewing position.

The switching device is preferably pivotable between two end positions in one of which the outlet of its slot means registers with the inlet of one guide means and in the other of which the outlet registers with the inlet of the other guide means. Shifting of the supplies with reference to the housing, pivoting of the takeup reels about the vertical axes, and/or pivoting of the switching device can take place in automatic response to tensioning of the film which is being withdrawn from the supply occupying the viewing position; such tensioning normally takes place upon completion of presentation of images on the frames of the film. The just mentioned tensioning of film whose frames were transported behind the projection lens can also trigger the operation of automatic film threading mechanism and/or the operation of automatic rewinding means.

The novel features which are considered as characteristic of the invention are set forth in particular in the appended claims. The improved motion picture projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a diagrammatic fragmentary horizontal sectional view as seen in the direction of arrows from the line II—II of FIG. 1;

FIG. 3 illustrates the structure of FIG. 2 but with the takeup reels and the associated guide means in different angular positions;

FIG. 4 is a view similar to that of FIG. 2 but showing the supplies of convoluted film in different positions.

DESCRIPTION OF THE PREFERRED EMBODIMENTS

Figure 1:
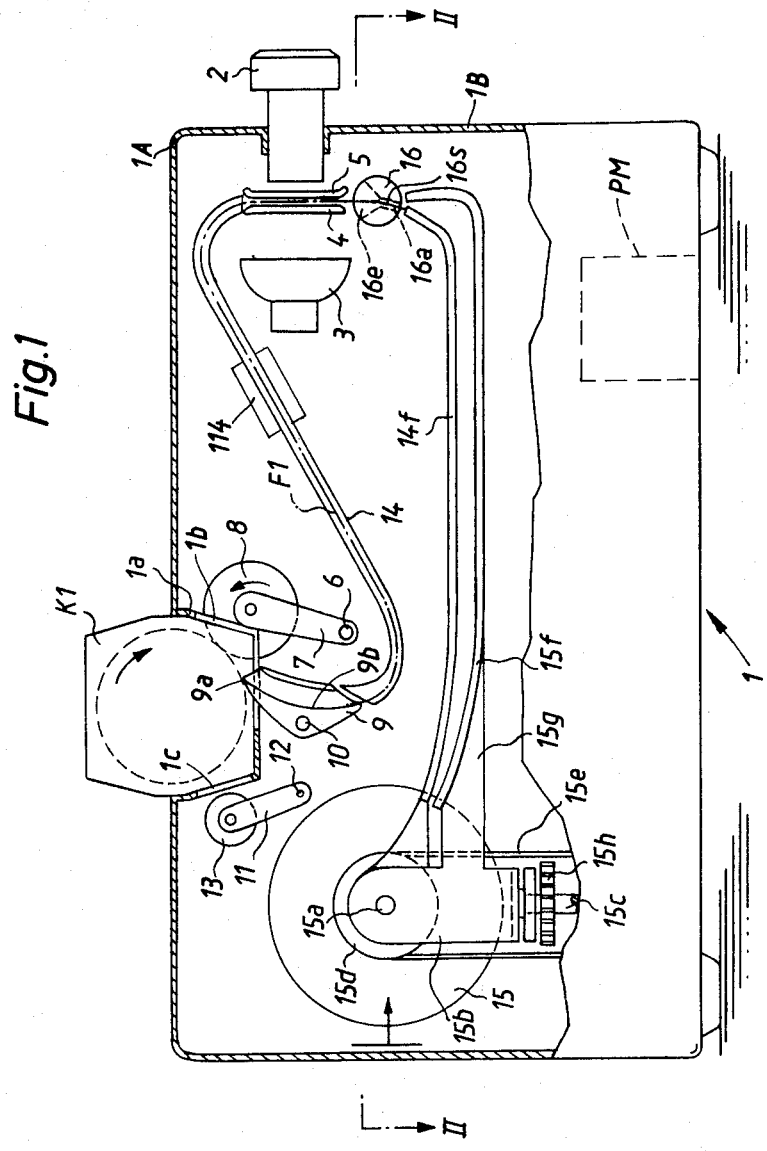
FIG. 1 is a diagrammatic side elevational view of a motion picture projector which embodies the invention, with a portion of the housing broken away.

Referring first to FIG. 1, there is shown a motion picture projector having a housing 1 the front wall 1B of which carries a projection lens 2 located in front of an illuminating unit 3 which is mounted in the interior of the housing. The film whose images are to be projected onto a screen or the like (not shown) is caused to pass in front of a film gate 4 which is mounted between the lens 2 and illuminating unit 3 and behind a customary pressure plate 5. The latter can be moved toward and away from the gate 4 to respectively engage and be disengaged from a film frame which registers with the opening of the gate.

The top wall 1A of the housing 1 is provided with a receptacle or supporting means 1a for a stack of cassettes or magazines K1, K2, K3, K4 (see also FIGS. 2 to 4). The cassettes are inserted into the receptacle 1a in such a way that the planes of supplies of convoluted motion picture film therein are parallel with the optical axis of the projection lens 2. The housing 1 further accommodates or supports a preferably automatic film threading mechanism which serves to advance the leader of the film in a selected cassette along a predetermined path a portion of which extends between the gate 4 and the pressure plate 5 and which extends on toward one of two takeup reels 14, 15 mounted in the interior of the housing 1. The film threading mechanism comprises a device which serves to rotate the supply of convoluted film in the selected cassette in a direction to pay out the film and a deflector 9 which deflects the leader of such film into the aforementioned path. The device for rotating supplies of convoluted film in selected cassettes comprises a friction wheel 8 which is mounted on a lever 7 for rotation about its own axis and for pivotal movement about the axis of a fixed pin 6 in the housing 1. The receptacle 1a has a cutout or opening 1b through which the friction wheel 8 can be moved in response to pivoting of the lever 7 to the position of FIG. 1 whereby the peripheral surface of the wheel 8 abuts against the outermost convolution of the supply of film in the adjacent cassette (see the cassette K1 of FIG. 1). Each cassette is provided with a window which registers with the cutout 1b when the respective cassette occupies a viewing position corresponding to that of the cassette K1 shown in FIGS. 1 and 2 whereby the friction wheel 8 can pass through such window in order to engage the outermost convolution of the film. The friction wheel 8 can be driven by a suitable transmission (now shown) which derives motion from the main prime mover PM (e.g., an electric motor) of the projector.

The deflector 9 is turnable on a pivot member 10 and has a tooth or blade 9a which can be moved through the cutout 1b and through the window of the selected cassette (K1 in FIG. 1) so as to engage the outermost convolution of the film supply downstream of the point of engagement between the outermost convolution and the friction wheel 8. When the friction wheel 8 rotates the supply of film in a direction to pay out the film, the leader of the film is deflected by the projection 9a of the deflector 9 and is compelled to enter the inlet of the aforementioned path to advance toward the space between the gate 4 and the pressure plate 5 and thence toward the core of one of the takeup reels 14, 15.

The receptacle 1a is further provided with a second opening or cutout 1c for the passage of a friction wheel 13 mounted on a lever 11 which is fulcrumed in the housing 1, as at 12, and constituting an element of an automatic rewinding mechanism. The cutout 1c registers with the aforementioned window of a cassette which occupies a predetermined rewinding position or with separate window of such cassette so that the friction wheel 13 can be pivoted into engagement with the innermost convolution of the supply of film in the cassette in order to rewind the film by withdrawing it from one of the takeup reels 14, 15. The friction wheel 13 is driven by a second transmission (not shown) which also derives motion form the prime mover PM of the projector.

The aforementioned path for the film which is being withdrawn from the interior of a cassette occupying the selected or viewing position is defined in part by a stationary channel 14 which has an inlet adjacent to a concave guide surface 9b of the deflector 9 (in the illustrated operative position of the deflector) and an outlet adjacent to the upper end of the space between the gate 4 and the pressure plate 5. The width of the channel 14 is assumed to be such that the channel can accommodate two stretches of motion picture film side by side, namely, a first stretch forming part of a film (F2 in FIG. 3) which is being transported from a cassette (K2 in FIG. 3) occupying the selected viewing position to one (15) of the takeup reels 14, 15 and a second stretch forming part of a film (F1 in FIG. 3) which is being transported by friction wheel 13 from the other takeup reel (14) into the interior of a cassette (K1 in FIG. 3) occupying the aforementioned predetermined or rewinding position. The stretch of that film which is being transported toward the one takeup reel is caused to pass between the pressure plate 5 and the gate 4 so that its frames are movable into registry with the optical system 2 and illuminating unit 3. The friction wheel 8 and the deflector 9 are located in a plane which coincides with the plane of the gate 4, and the friction wheel 13 is located in the plane of the stretch of that film which is being transported back into a cassette in the receptacle 1a. Thus, the film which is being transported back into the respective cassette is laterally adjacent to the path for the film which is being transported from a cassette in the receptacle 1a, past the gate 4, and on toward one of the takeup reels.

The takeup reel 14, 15 are spaced from each other and are respectively mounted on horizontal shafts 14a, 15a. As shown in FIGS. 2 to 4, the shafts 14a, 15a are respectively mounted in bifurcated bearing members 14b and 15b. The drive means for the takeup reels 14, 15 comprises two pulleys 14d, 15d which are respectively mounted on the shafts 14a, 15a and can be rotated by belt transmissions 14e, 15e receiving motion from the prime mover PM. The bearing members 14b, 15b are pivotable about the axes of vertical shafts 14c, 15c so that the shafts 14a, 15a can be moved into axial alignment (FIGS. 2 and 4) as well as to positions (see, for example, FIG. 3) in which their axes are inclined with reference to each other. The extent of pivotal movements of the bearing members 14b, 15b between the end positions shown in FIGS. 2 and 3 or 3 and 4 can be limited by the distance between the takeup reels 14, 15.

The shafts 14c, 15c are connected with pivoting means in the form of gears 14h, 15h which mesh with each other so that the rotation of bearing member 14b in a clockwise direction automatically entails a rotation of the bearing member 15b in a counterclockwise direction, or vice versa.

The projector further comprises two channel-shaped elongated hollow guide members 14f, 15f which are respectively associated with the takeup reels 14, 15 and can be mounted on the respective bearing members 14b, 15b. In the illustrated embodiment, the guide members 14f, 15f are respectively se cured to the bearing members 14b, 15b by connecting arms 14g, 15g. Thus, the guide members 14f, 15f are compelled to share all pivotal movements of the respective takeup reels about the axes of the vertical shafts 14c, 15c for the bearing members. The guide member 15f is located at a level slightly below the level of the guide member 14f so that it cannot interfere with pivotal movements of the member 14f and vice versa. The major portion of the guide member 14f is parallel or nearly parallel to the major portion of the guide member 15f. The outlets at the left-hand ends of the guide members 14f, 15f are mounted in such positions that they are outwardly adjacent to the outermost convolutions of maximum supplies of film which can be stored on the cores of the respective takeup reels 14, 15. The inlets at the right-hand ends of the guide members 14f, 15f are adjacent to a switching device 16 which is pivotable about the axis of a horizontal shaft 16b mounted in a bearing 16c of the housing 1. It will be noted that the guide member 15f is somewhat longer than the guide member 14f by having its right-hand end located slightly to the right of the right-hand end of the guide member 14f (see FIGS. 1 and 2). The shaft 16b is normal to that stretch of a film which passes between the gate 4 and the pressure plate 5.

The switching device 16 is shown in the form of a cylindrical body having a diametrically extending slot or passage 16s the lower portion or outlet 16a of which can be moved into registry with the inlet of the guide member 14f or 15f and the upper portion or inlet 16e of which flares or diverges upwardly toward the lower end of the space between the gate 4 and the pressure plate 5. The minimum width of the slot 16s exceeds the maximum thickness of a motion picture film (even the thickness of a splice which might be provided to connect two lengths of motion picture film end-to-end). The length of the slot 16s, as considered in the axial direction of the shaft 16b, exceeds the width of a motion picture film (see FIG. 2) and one side of the slot 16s is open at one axial end of the switching device 16. The angle of divergence of surfaces flanking the inlet 16e of the slot 16s is such that the inlet 16e registers with the space between the gate 4 and the pressure plate 5 irrespective of whether the outlet 16a registers with the inlet at the adjacent right-hand end of the guide member 14f or 15f. The switching device 16 can be pivoted by hand or automatically, for example, in response to automatic tensioning of film which has been fully convoluted on the core of one of the takeup reels 14, 15 subsequent to completed projection of its images onto a screen or the like. In FIG. 2, the outlet 16a of the slot 16s registers with the inlet at the adjacent end of the guide member 14f while the switching device 16 assumes one of its end positions. In FIG. 3, the switching device 16 assumes its other end position (with reference to the axis of the shaft 16b) and the outlet 16a of its slot 16s registers with the inlet at the adjacent end of the guide member 15f. It will be noted that the placing of the inlet at the right-hand end of the guide member 14f or 15f into registry with the outlet 16a of the slot 16s necessitates a pivotal movement of the respective bearing member 14b or 15b about the axis of the associated vertical shaft 14c or 15c.

The operation:

FIG. 2 illustrates the switching device 16 and the guide members 14f, 15f in positions they assume when the projector is in the process of projecting the images of frames on motion picture film F1 which is being withdrawn from a cassette K1 occupying the aforementioned selected or viewing position with reference to the housing 1 and receptacle 1a. The plane of the cassette K1 then coincides with the planes of the projection lens 2, gate 4, illuminating unit 3, channel 14, friction wheel 8, deflector 9, cut-out 1b of the receptacle 1a, and takeup reel 14. The shaft 14a of the takeup reel 14 is normal or substantially normal to the plane of the cassette K1. The outlet 16a of the slot 16s in the switching device 16 registers with the inlet at the right-hand end of the guide member 14f so that the latter can guide the film F1 toward the takeup reel 14.

Prior to threading of the leader of film F1 into the path defined in part by the channel 14, the operator causes the friction wheel 8 and the deflector 9 to assume the operative positions shown in FIG. 1 so that the peripheral surface of the friction wheel 8 engages the outermost convolution of the supply of convoluted motion picture film F1 in the cassette K1 at a point located upstream of the point of contact between the supply of film F1 and the projection 9a of the deflector 9. The friction wheel 8 is driven by the prime mover PM to rotate in a counterclockwise direction, as viewed in FIG. 1, whereby the supply of film F1 in the cassette K1 rotates in the opposite direction so that the leader of the film F1 engages with and is deflected by the projection 9a of the deflector 9. The leader then slides along the concave surface 9b of the deflector 9 and is compelled to enter the inlet of the channel 14 to be guided toward the space between the gate 4 and the pressure plate 5. The friction wheel 8 and the deflector 9 can be moved to their retracted or inoperative positions as soon as the leader of the film F1 reaches the customary claw pull-down (not shown) which is mounted in the region of the gate 4 and derives motion from the prime mover PM to advance the film F1 in stepwise fashion in order to place successive frames of the film F1 into registry with the projection lens 2. If desired, the friction wheel 8 can remain in engagement with the supply of film F1 in the cassette K1 until the leader of the film F1 reaches the core of the takeup reel 14. The latter can be provided with automatic clamping means which releasably secures the leader to its core; such clamping means is well known in the art and, therefore, has not been shown in the drawing. The pressure plate 5 is held in the retracted or inoperative position while the leader of the film F1 advances toward the slot 16s of the switching device 16 so that the leader can advance freely along that portion of the path which extends in front of the gate 4. The leader can readily find its way into the slot 16s because the inlet 16e flares outwardly and upwardly toward the lowermost part of the space between the gate 4 and the pressure plate 5. The outlet 16a of the slot 16s is assumed to register with the inlet at the right-hand end of the guide member 14f (see FIG. 2) so that the leader of the film F1 automatically enters the guide member 14f and is compelled to advance toward the core of the takeup reel 14. Once the leader is attached to the takeup reel 14, the film F1 is automatically drawn through the guide member 14f in response to rotation of the reel 14 under the action of the pulley 14d and transmission 14e. The drive means 14d, 14e for the takeup reel 14 cooperates with the aforementioned claw pull-down to insure satisfactory transport of the film F1 from the cassette K1 toward the takeup reel 14 whereby the drive 14d, 14e insures that the film is convoluted on the core of the takeup reel 14 and the pull-down insures the successive frames of the film F1 move into registry with the gate 4 and projection lens 2. The pressure plate 5 reassumes its operative position and cooperates with the gate 4 to insure that the film frame which registers with the lens 4 is located in a predetermined plane not later than when the presentation of images begins, for example, immediately after the leader of the film F1 enters the slot 16s, the guide member 14f, or is attached to the core of the takeup reel 14.

When the presentation of images of frames on the film F1 is completed, the tension of film F1 increases automatically because the trailing end of the film F1 is secured to the cassette K1 in the customary way and because the claw pulldown still tends to transport the film F1 in a forward direction, namely, toward the slot 16s of the switching device 16. Such rising tension can be resorted to in a known manner to trigger the rewinding operation, i.e., the transport of the entire film F1 back into the interior of the respective cassette K1. At the same time, such rise in tension of the film F1 can be used to trigger the threading operation of film F2 in the next-following cassette K2 which is located behind the cassette K1 in the receptacle 1a of the housing 1. In the first step, increased tensioning of the film F1 can cause a stoppage of the claw pull-down and a stoppage of the drive means 14d, 14e for the takeup reel 14. Also, the rising tensioning of the film F1 can trigger the operation of an advancing or shifting mechanism 117 (FIG. 2) which can automatically advance the battery of cassettes K1, K2, K3, K4 by a step so that the cassette K1 assumes a rewinding position (FIG. 3) and the cassette K2 assumes the viewing position previously occupied by the cassette K1. The distance through which the cassettes are shifted sideways in the receptacle 1a (arrow 17) corresponds to or approximates the thickness of a cassette.

The mechanism 117 which shifts the cassettes K1, K2, K3, K4 sideways (arrow 17) also serves to initiate a pivotal movement of the takeup reel 14, bearing member 14b and guide member 14f from the position of FIG. 2 to the position of FIG. 3 (arrow 19) so that the film F1 is automatically moved out of registry with the projection lens 2. To this end, the shifting mechanism 117 can actuate a transmission or a clutch which connects the pivoting mans 14h, 15h with the prime mover PM so that the takeup reel 14 pivots in a clockwise direction while the takeup reel 15 pivots in a counterclockwise direction (see arrows 19 and 20 in FIG. 3). The extent of pivotal movement of the takeup reel 14 in a clockwise direction about the axis of the shaft 14c is such that the film F1 leaves the slot 16s (note that one side of the slot 16s is open) so that the film F1 can be rewound on the core of the supply reel in the cassette K1 which occupies the rewinding position of FIG. 3. The friction wheel 13 is pivoted with the lever 11 in a clockwise direction, as viewed in FIG. 1, to pass through the cutout 1c of the receptacle 1a and to bear against the film F1 in the cassette K1. The friction wheel 13 rotates in a clockwise direction, as viewed in FIG. 1, and convolutes the entire film F1 about the core of the supply reel in the cassette K1.

Figure 5:
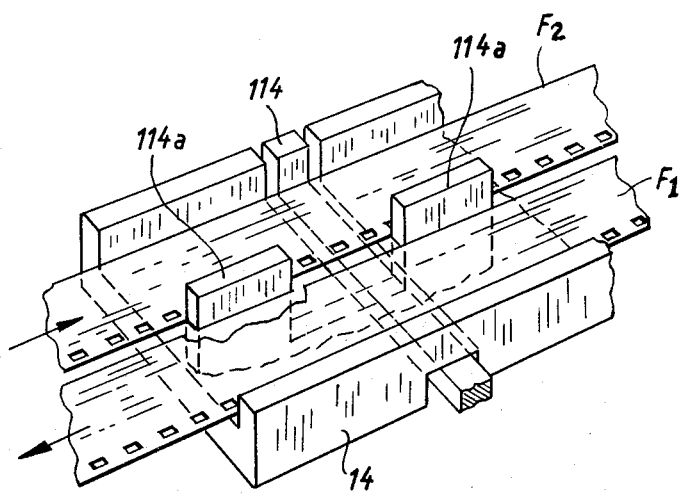
FIG. 5 is an enlarged perspective view of a detail of the guide means for motion picture film.

The channel 14 can be provided with a displacing device or pusher 114 shown in FIG. 5 which responds to tensioning of the film F1 upon completed projection of images on the frames of the film F1 and pushes this film sideways so as to assist the sidewise expulsion of film F1 from the slot 16s of the switching device 16. The channel 14 is then preferably provided with rails or projections 114a which define the path for a film in projection or viewing position and are shiftable by the pusher 114 to permit movement of such film to the rewinding position.

Once the film F1 is expelled from the slot 16s, the switching device 16 is pivoted about the axis of the shaft 16b in the direction indicated by the arrow 18 (FIG. 3) so that the outlet 16a of the slot 16s registers with the inlet at the right-hand end of the guide member 15f which is pivoted by the gears 14h, 15h (arrow 20) in response to pivoting of the takeup reel 14. The switching device 16 is then ready to introduce the leader of the film F2 in the cassette K2 (which occupies the viewing position of FIG. 3) into the inlet of the guide member 15f and thence to the core of the takeup reel 15. The threading mechanism including the friction wheel 8 and the deflector 9 is then operated in the aforedescribed manner to advance the leader of the film F2 through the opening in the bottom panel of the cassette K2, along the concave surface 9b of the deflector 9, through the channel 14, between the gate 4 and the pressure plate 5 (which latter is held in its retracted position) and into the range of the claw pull-down which can complete the transport of the leader to the core of the takeup reel 15. The projection of images on the frames of the film F2 can take place during rewinding of film F1 into the cassette K1 while the latter dwells in the rewinding position of FIG. 3. Thus, the takeup reel 14 is empty not later than when the projection of images on the frames of the film F2 is completed, and the reel 14 is then ready to store a third film F3 which can be threaded along the aforedescribed path immediately after the cassettes K1, K2, K3 . . . are advanced by a step (arrow 17) on actuation of the shifting mechanism 117 so as to place the cassette K3 into the viewing position simultaneously with movement of the cassette K2 to the rewinding position (FIG. 4). The tensioning of film F2 upon completed projection of its images results in a pivotal movement of the takeup reels 14, 15 counter to the directions indicated by the arrows 19 and 20 so that these reels assume the positions shown in FIG. 4. Thus, the film F2 is automatically expelled from the slot 16s of the switching device 16 and it can be returned into the cassette K2 by the friction wheel 13 while the friction wheel 8 expels the leader of the film F3 from the cassette K3 which occupies the viewing position. The pivotal movement of takeup reels 14, 15 counter to the directions indicated by the arrows 19, 20 is followed by a pivotal movement of the switching device 16 in the direction indicated by the arrow 18' (FIG. 4) so that the outlet 16a of the slot 16s registers with the inlet at the adjacent end of the guide member 14f before the leader of the film F3 reaches the inlet 16e. The film F3 is thereupon collected by the takeup reel 14 while the takeup reel 15 pays out the film F2 for rewinding onto the core of the supply reel in the cassette K2. The rewinding of film F2 is completed not later than at the time when the presentation of images on the frames of the film F3 is completed so that the cassette can be shifted in the direction indicated by the arrow 17 in order to move the cassette K3 to the rewinding position and to place a fourth cassette K4 (FIG. 4) into the viewing position. The receptacle 1a can be designed to accommodate a substantial number of cassettes and it can constitute a tray which is movable relative to the housing 1 in response to actuation of the shifting mechanism 117. Also, one or more cassettes which are located downstream of the cassette occupying the rewinding position can be removed and one or more cassettes can be inserted into the receptacle 1a upstream of the cassette which occupies the viewing position.

An important advantage of the improved motion picture projector is that it comprises a small number of relatively simple parts. The guide members 14f, 15f can be used as a means for expelling the films F1, F2, F3 . . . sideways from the slot 16s of the switching device 16 in response to pivoting of the takeup reels 14, 15 in or counter to the directions indicated by the arrows 19, 20 and simultaneously or substantially simultaneously with sidewise movement of cassettes in the receptacle 1a in the direction indicated by the arrow 17. The switching device 16 is very simple, rugged, compact and generates a small amount of friction, not only during pivoting in the directions indicated by arrows 18, 18' but also while a film slides along the surfaces bounding its slot 16s.

Another important advantage of the improved projector is that the film which is being rewound onto the core of the supply reel in the respective cassette need not pass through the slot 16s of the switching device and/or between the gate 4 and pressure plate 5. Therefore, the wear on and the likelihood of damage of film during rewinding is minimal. If desired, the channel 14 between the receptacle 1a and the gate 4 can be designed in such a way that the film which is to be returned into the respective cassette need not pass through the channel 14; this further reduces the likelihood of wear and/or damage to such film.

A further important advantage of the improved projector is that the film which is being expelled from the slot 16s of the switching device 16 is not likely to become twisted, especially if the shifting of cassettes K1-K4 by the mechanism 117 takes place simultaneously with pivoting of the takeup reel 14, 15. The likelihood of such twisting is further reduced due to the provision of displacing means 114 which can shift the film sideways out of registry with the gate 4 and slot 16s simultaneously with sidewise movement of cassettes K1-K4 in the receptacle 1a.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:
1. In a cinematographic apparatus, a combination comprising a housing; a projection lens mounted in said housing; means for supporting on said housing a series of supplies of convoluted motion picture film; shifting means for moving said supplies stepwise so as to place successive supplies into a viewing position and thereupon into a rewinding position; first and second takeup reels rotatably supported by said housing and pivotable therein about first and second axes between first and second positions, said first and second axes being respectively normal to the axes of said first and second reels; a switching device mounted in said housing for guiding the film in such a way that the film registers with said projection lens, said switching device having slot means for the passage of film therethrough; first and second film guide means respectively arranged to share the pivotal movements of said first and second reels so that said first and second guide means respectively register with said switching device and guide a film between said switching device and the respective reels in the first and second positions of said reels, said slot means of said switching device having an outlet movable between a first position to register with one of said guide means in the first positions of said reels and a second position to register with the other of said guide means in the second positions of said reels; film threading means arranged to transport the leader of film of the supply occupying said viewing position to said switching device and into the guide means which registers with said switching device; rewinding means for rewinding the film from the takeup reel associated with the guide means which is out of registry with said switching device onto the supply occupying said rewinding position; and means for pivoting said reels on actuation of said shifting means so that said reels are pivoted between said positions whenever a fresh supply of film assumes said viewing position.

2. A combination as defined in claim 1, wherein said outlet registers with that guide means which is associated with the takeup reel receiving film from a supply occupying said viewing position.

3. A combination as defined in claim 2, wherein said slot means has an open side for permitting expulsion of film from such slot means in response to each movement of said guide means between said first and second positions.

4. A combination as defined in claim 2, wherein said switching device is pivotable about a predetermined axis to thereby move the outlet of said slot means between said first and second positions.

5. A combination as defined in claim 4, wherein said predetermined axis is normal to the direction of movement of film through said slot means.

6. A combination as defined in claim 2, wherein the minimum width of said slot means at least slightly exceeds the maximum thickness of a film and said slot means has an inlet which flares outwardly in a direction away from said outlet.

7. In a cinematographic apparatus, a combination comprising a housing; a projection lens mounted in said housing; means for supporting on said housing a series of supplies of convoluted motion picture film; shifting means for moving said supplies stepwise so as to place successive supplies into a viewing position and thereupon into a rewinding position; first and second takeup reels rotatably supported by said housing and pivotable therein about first and second axes between first and second positions, said reels being spaced apart from each other in at least one of said positions thereof and being coaxial in one of said positions thereof; a switching device mounted in said housing for guiding the film in such a way that the film registers with said projection lens; first and second film guide means respectively arranged to share the pivotal movements of said first and second reels so that said first and second guide means respectively register with said switching device and guide a film between said switching device and the respective reels in the first and second positions of such reels; film threading means arranged to transport the leader of film of the supply occupying said viewing position to said switching device and into the guide means which registers with said switching devices; rewinding means for rewinding the film from the takeup reel associated with the guide means which is out of registry with said switching device onto the supply occupying said rewinding position; and means for pivoting said reels on actuation of said shifting means so that said reels are pivoted between said positions whenever a fresh supply of film assumes said viewing position.

8. In a cinematographic apparatus, a combination comprising a housing; a projection lens mounted in said housing; means for supporting on said housing a series of supplies of convoluted motion picture film; shifting means for moving said supplies stepwise so as to place successive supplies into a viewing position and thereupon into a rewinding position; first and second takeup reels rotatably supported by said housing and pivotable therein about parallel first and second axes between first and second positions; a switching device mounted in said housing for guiding the film in such a way that the film registers with said projection lens; first and second film guide means respectively arranged to share the pivotal movements of said first and second reels so that said first and second guide means respectively register with said switching device and guide a film between said switching device and the respective reels in the first and second positions of such reels; film threading means arranged to transport the leader of film of the supply occupying said viewing position to said switching device and into the guide means which registers with said switching device; rewinding means for rewinding the film from the takeup reel associated with the guide means which is out of registry with said switching device onto the supply occupying said rewinding position; and means for pivoting said reels on actuation of said shifting means so that said reels are pivoted between said positions whenever a fresh supply of film assumes said viewing position.

9. A combination as defined in claim 8, wherein said takeup reels are spaced from each other in at least one of said positions thereof.

10. A combination as defined in claim 8, wherein said guide means have portions located in parallel planes.

11. A combination as defined in claim 8, further comprising a gate located in said housing behind said projection lens, said threading mechanism comprising channel means for guiding two films in a substantially common plane while one of such films advances from a supply occupying said viewing position past said gate and into a passage of said switching device and the other film advances from the guide means which is out of registry with said switching device toward the supply occupying said rewinding position.

12. A combination as defined in claim 11, further comprising displacing means actuatable to move a film in said channel means sideways out of registry with said switching device in response to movement of the respective supply from said viewing position to said rewinding position.

13. A combination as defined in claim 8, wherein each of said supplies is stored in a discrete cassette and said shifting means is arranged to move such cassettes with reference to said housing.

14. A combination as defined in claim 8, wherein said rewinding means is arranged to return the film from one of said reels to the supply occupying said rewinding position while the film in the supply occupying said viewing position is being transported toward said switching device and is collected by the other reel.

15. A combination as defined in claim 8, wherein said first and second axes are respectively normal to the axes of said first and second reels.

16. In a cinematographic apparatus, a combination comprising a housing; a projection lens mounted in said housing; a gate located in said housing behind said projection lens; means for supporting on said housing a series of supplies of convoluted motion picture film; shifting means for moving said supplies stepwise so as to place successive supplies into a viewing position and thereupon into a rewinding position; first and second takeup reels rotatably supported by said housing and pivotable therein about first and second axes between first and second positions; a switching device mounted in said housing for guiding the film in such a way that the film registers with said projection lens; first and second film guide means respectively arranged to share the pivotal movements of said first and second reels so that said first and second guide means respectively register with said switching device and guide a film between said switching device and the respective reels in the first and second positions of such reels; film threading means arranged to transport the leader of film of the supply occupying said viewing position to said switching device and into the guide means which registers with said switching device, said film threading means comprising channel means for guiding two films in a substantially common place while one of said two films advances from a supply occupying said viewing position past said gate and into a passage of said switching device and the other of said two films advances from the guide means which is out of registry with said switching device toward the supply occupying said rewinding position; rewinding means for rewinding the film from the takeup reel associated with the guide means which is out of registry with said switching device onto the supply occupying said rewinding position; means for pivoting said reels on actuation of said shifting means so that said reels are pivoted between said positions whenever a fresh supply of film assumes said viewing position; and displacing means actuatable to move a film in said channel means sideways out of registry with said switching device in response to movement of the respective supply from said viewing position to said rewinding position, said displacing means including guide rail means movable transversely of said channel means.

* * * * *